US006327846B1

(12) United States Patent
Feder et al.

(10) Patent No.: US 6,327,846 B1
(45) Date of Patent: Dec. 11, 2001

(54) UNIVERSAL-JOINT VECTORING SYSTEM FOR A TURBOJET-ENGINE EXHAUST NOZZLE

(75) Inventors: Didier Georges Feder, Savigny le Temple; Guy Jean-Louis Lapergue, Rubelles, both of (FR)

(73) Assignee: SCNEMA Moteurs (FR)

( * ) Notice: Subject to any disclaimer, the term of this patent is extended or adjusted under 35 U.S.C. 154(b) by 0 days.

(21) Appl. No.: 09/551,749

(22) Filed: Apr. 18, 2000

(30) Foreign Application Priority Data

Apr. 19, 1999 (FR) .................................................. 99 04871

(51) Int. Cl.[7] ............................... F02K 1/12; B64C 15/00
(52) U.S. Cl. ................. 60/232; 239/265.35; 239/265.41
(58) Field of Search ............... 60/230, 232; 239/265.17, 239/265.19, 265.33, 265.35, 265.37, 265.39, 265.41, 127.3

(56) References Cited

U.S. PATENT DOCUMENTS

| 3,003,312 | | 10/1961 | Jewell . | |
| 4,508,270 | * | 4/1985 | Joubert | 239/265.35 |
| 4,836,451 | | 6/1989 | Herrick et al. . | |
| 4,993,641 | | 2/1991 | Kehret et al. . | |
| 5,239,815 | * | 8/1993 | Barcza | 60/230 |
| 5,351,888 | * | 10/1994 | Taylor et al. | 239/265.35 |
| 5,370,312 | | 12/1994 | Kight . | |
| 5,398,499 | * | 3/1995 | Urruela | 60/232 |
| 5,511,376 | * | 4/1996 | Barcza | 60/232 |
| 5,613,636 | * | 3/1997 | Zubillaga et al. | 239/265.35 |

FOREIGN PATENT DOCUMENTS 0 029 773 A1    6/1981   (EP) .
0 060 763 A1    9/1982   (EP) .

* cited by examiner

Primary Examiner—Ted Kim
(74) Attorney, Agent, or Firm—Bacon & Thjomas PLLC

(57) ABSTRACT

The invention relates to a wide-vectoring, axisymmetric turbojet-engine exhaust nozzle including vectoring structure (12) supporting a plurality of converging flaps (21). The vectoring structure is mounted on the downstream end of an exhaust housing (2) by means of an intermediate ring (9) which is pivotable about a first axis relative to the exhaust housing (2) and further about a second axis perpendicular to the first axis and relative to the vectoring structure (12). The converging flaps (21) hinge on the downstream end of the vectoring structure (12). A single drive ring (27) controlled by three linear actuators (28) and linked by linkrods (24) to the converging flaps (21) controls the tipping of the vectoring structure (12) and the kinematics of the flaps (21).

8 Claims, 5 Drawing Sheets

UNIVERSAL-JOINT VECTORING SYSTEM FOR A TURBOJET-ENGINE EXHAUST NOZZLE

BACKGROUND OF THE INVENTION

1. Field of the Invention

The present invention relates to an axisymmetric and wide-vectoring turbojet-engine exhaust nozzle.

2. Related Art

More specifically the invention relates to an axisymmetric, wide-vectoring turbojet-engine exhaust nozzle comprising a converging-flaps drive arrangement supported on a vectoring structure which in turn is mounted on the downstream end of an exhaust housing having an axis X, said vectoring structure being able to tilt or rotate about a fixed center O located on the axis X. A means also is provided to tilt or rotate the vectoring structure and to regulate the exhaust cross-section of the converging flaps.

European Patent Document 0,029,773 discloses a converging nozzle of this kind wherein the vectoring structure is connected to the exhaust housing by elastic means reacting all transverse loads. The axial loads are reacted by linear control actuators tipping the vectoring structure. A second set of linear actuators anchored in the vectoring structure is used to regulate the nozzle exhaust cross-section.

European Patent Document 0,060,763 suggests a vectoring structure fitted with spherical bearings cooperating with spherical supports of the exhaust housing with insertion of a guide and roller system between the bearings and the support. The vectoring structure is prevented from rotation at least one guide assembly consisting of a slide affixed to the stationary structure and one roller affixed to the vectoring structure. Vectoring is implemented by a set of linear actuators anchored in the exhaust housing, and the nozzle cross-section is regulated by a second set of linear actuators borne on the vectoring structure. In this design the linear actuators implementing the directionality of the vectoring structure must react forces arising from friction with, and rolling on, the structural spheres which as a rule are large and consequently sensitive to thermal and mechanical expansions and warping.

In the two above cited documents, the converging flaps hinge on the downstream end of the vectoring structure which in turn bears the linear control actuators for the flaps, as a result of which the weight of the pivoting portion is increased and the response time to vector the nozzle is lengthened.

U.S. Pat. No. 4,984,741 relates to a wide-vectoring, converging-diverging nozzle wherein the converging flaps are mounted to slide axially on a spherical vectoring structure and are driven by linear actuators supported on said structure. The connection between the vectoring structure and the exhaust housing is implemented by two pairs of diametrically opposite radial stubs which are firmly affixed to axial bases on the vectoring structure and the exhaust housing and which slide in brackets in the corresponding bases of the other part. These stubs absorb the transverse loads, however the axial loads are absorbed by the linear control actuators tipping the vectoring structure.

SUMMARY OF THE INVENTION

A first objective of the invention is a connection means between the vectoring structure and the exhaust housing whereby the rolling or frictional stresses and the transverse loads and most of the axial ones likewise are largely eliminated.

The invention solves this problem in that the vectoring structure is mounted on the downstream end of the exhaust housing by means of an intermediate ring pivotable about a first axis passing through the center O relative to the exhaust housing and also pivotable about a second axis perpendicular to the first axis and passing through the center O of the vectoring structure.

Advantageously the intermediate ring is connected to the vectoring structure by two first diametrically opposite pivoting links and is connected to the exhaust housing by two diametrically opposite pivoting links of which the axes of rotation are perpendicular to the axes of rotation of the two first pivoting links.

In order to cancel the effects from warping or tolerances, the first and second links are both swiveling.

The links between the intermediate ring and the vectoring structure, and the injection housing, prevent the vectoring structure from rotating about the axis of the exhaust housing. The axial forces applied to the vectoring structure are transmitted to the intermediate ring and then to the exhaust housing without passing through the means controlling the tilting of the vectoring structure.

In accordance with a second feature of the invention, the converging flaps hinge on the downstream end of the vectoring structure and the means tilting the vectoring structure and regulating the exhaust cross-section of the converging flaps comprise a single drive ring connected by linkrods to the converging flaps and driven by a plurality of linear actuators resting on the exhaust housing.

Preferably the nozzle shall furthermore includes a ring of diverging flaps which are hinged on the downstream ends of the converging flaps and which are connected by linkrods to the vectoring structure.

The nozzle also comprises a ring of outer flaps hinged at their upstream ends on the drive ring and connected by a flexible link to the diverging flaps. Illustratively this flexible link is a sliding link.

BRIEF DESCRIPTION OF THE DRAWINGS

Other advantages and features of the invention are elucidated in the illustrative description below and in relation to the attached drawings, wherein.

DETAILED DESCRIPTION OF A PREFERRED EMBODIMENT OF THE INVENTION

Figure 1:
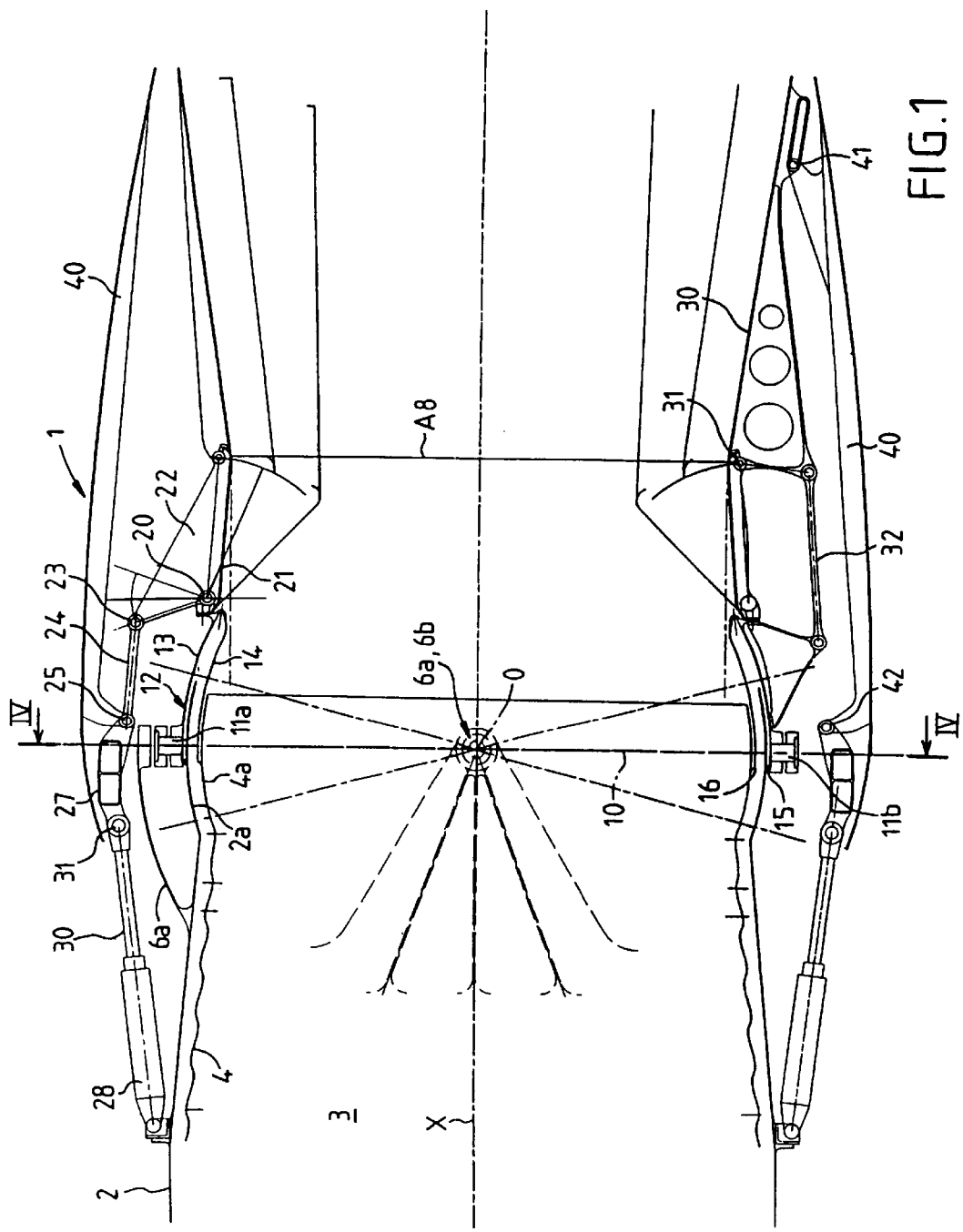
FIG. 1 is a transverse section view of a wide-vectoring, axisymmetric nozzle of the invention which is shown in the undirected, open position.
Figure 2:
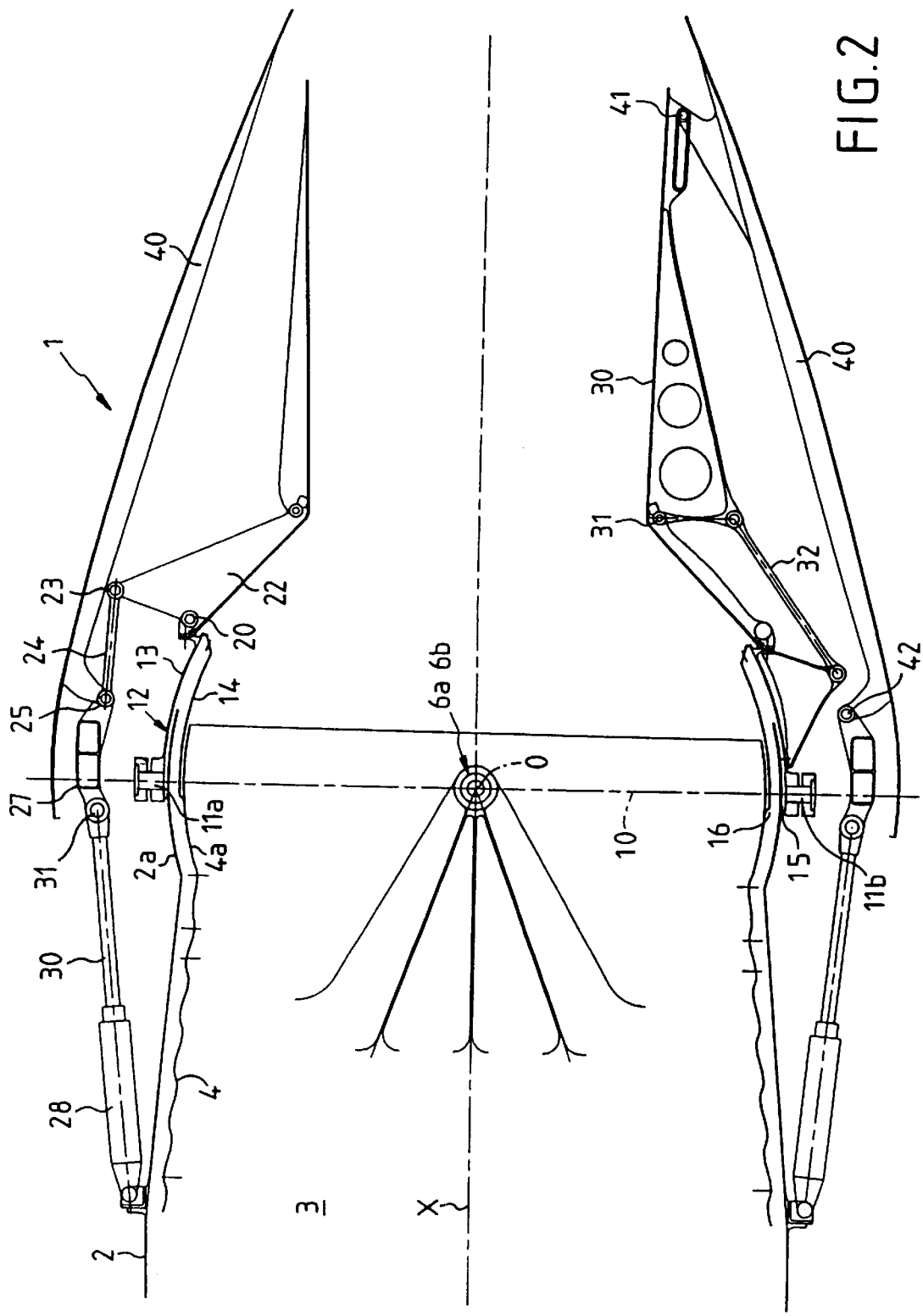
FIG. 2 is similar to FIG. 1 and shows the same nozzle in the undirected, closed position.
Figure 3:
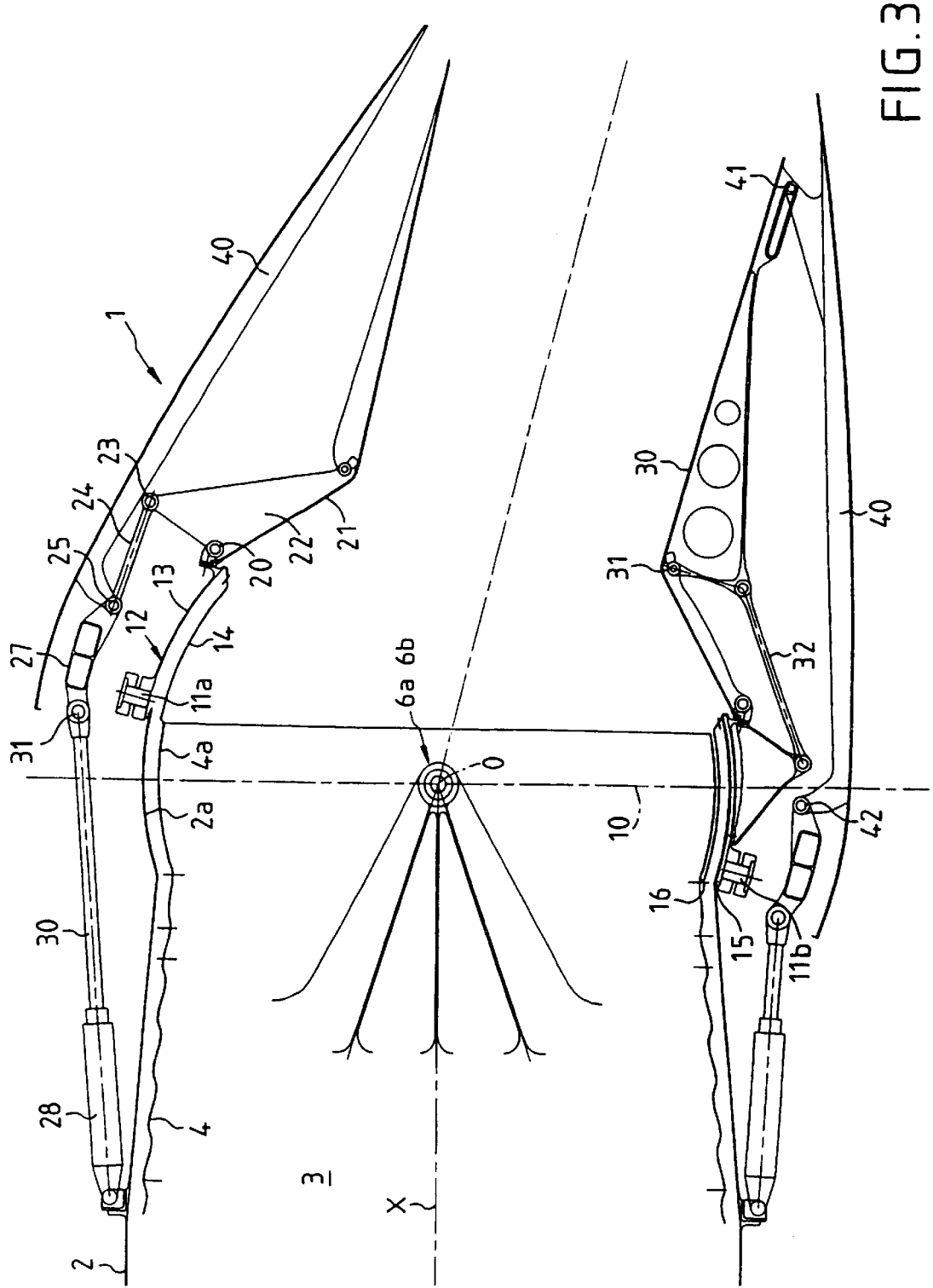
FIG. 3 is a view of the nozzle of FIG. 1 in the vectored and closed position.
Figure 4:
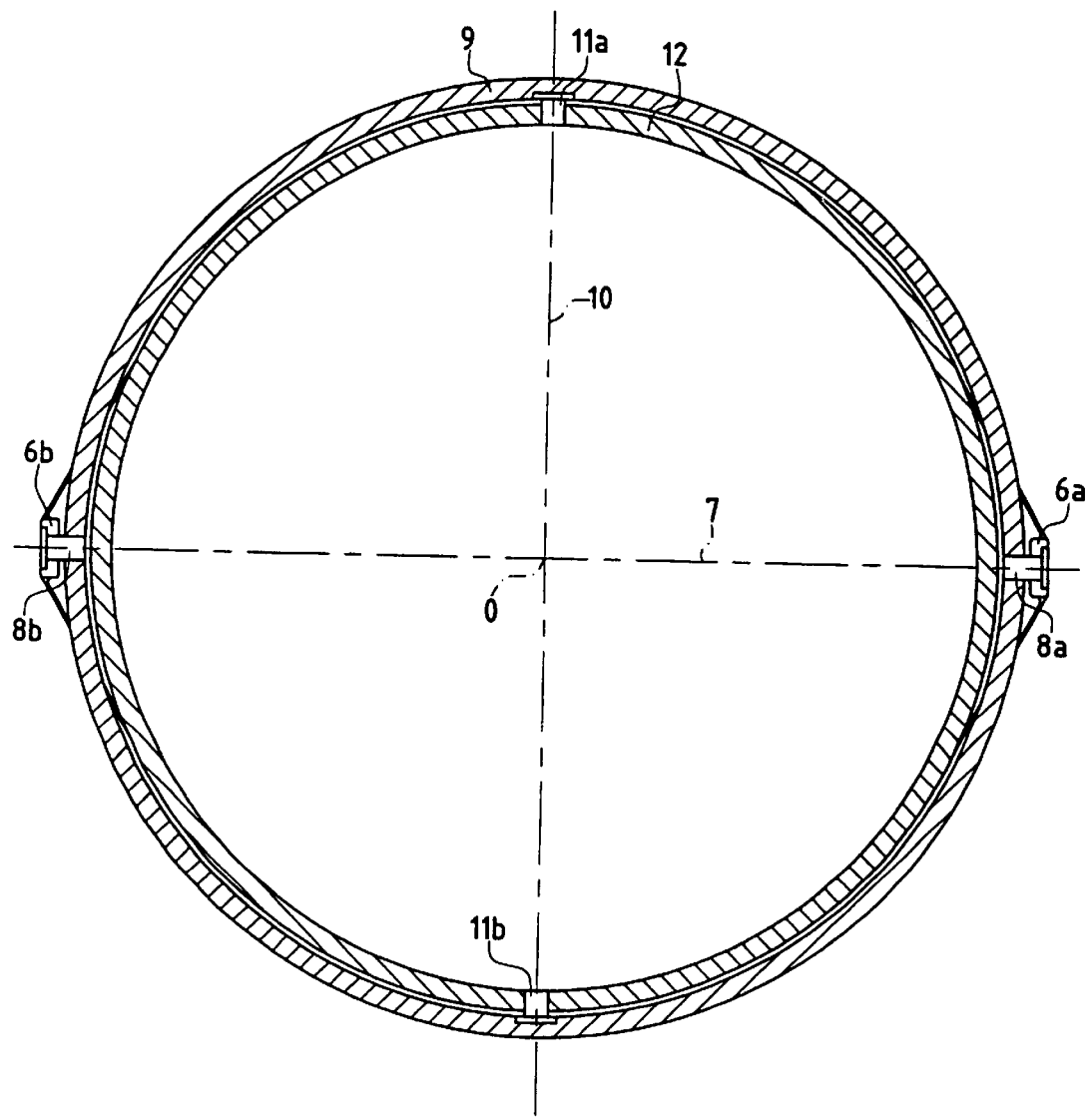
FIG. 4 is a section view along line IV—IV of FIG. 1 showing the connection means between the vectoring structure and the exhaust housing.
Figure 5:
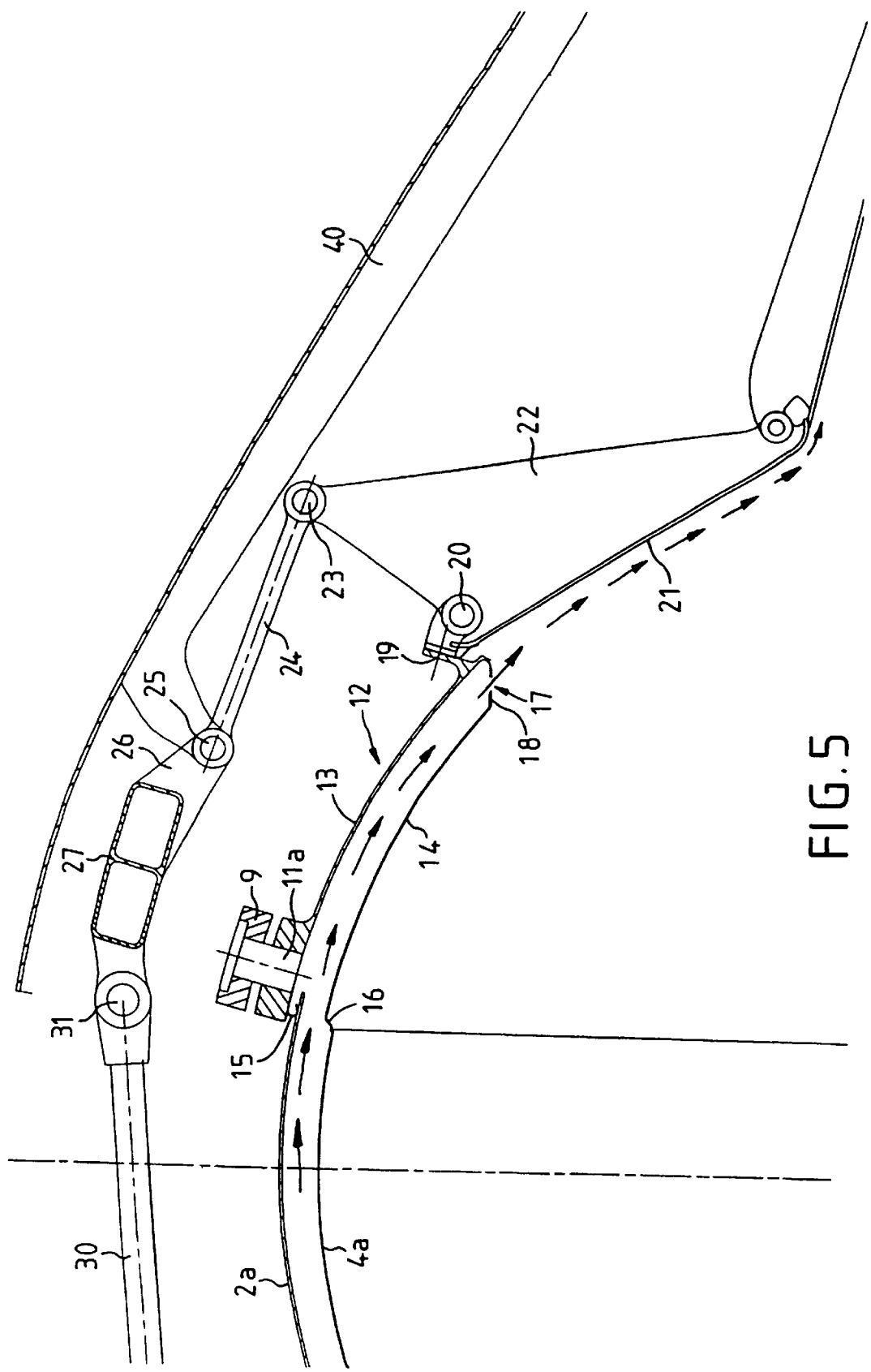
FIG. 5 shows a cooling system for the vectoring structure and the converging flaps.

The drawings show a vectoring nozzle 1 fitted on the end of an aircraft fuselage or pod.

The exhaust housing 2 extends along an axis X and defines an afterburner chamber 3, and is lined on its inside with a thermal heat shield 4. The exhaust housing 2 and the heat shield 4 both end downstream in spherical supports 2a and 4a.

The exhaust housing 2 also comprises at its downstream portion two diametrically opposite support arms 6a and 6b extending downstream outside the spherical supports 2a, 4b.

In FIG. 1, the support arms 6a is shown as if in the sectional plane, however these two arms in fact are situated underneath and above the plane of FIG. 1. The support arms 6a and 6b also might consist of a contoured bar of revolution enclosing the spherical supports 2a and 4a.

Said two support arms 6a and 6b support two diametrically opposite stubs 8a, 8b fixedly joined to an intermediate ring 9 having a center O so as to allow a pivoting motion about an axis 7 through the center O of the spherical supports 2a and 4a. The intermediate ring 9 supports (in pivotable manner about an axis 10 extending perpendicular to the axis 7 and passing through said center O) two diametrically opposite stubs 11a and 11b which are fixedly joined to a vectoring structure 12.

The vectoring structure 12 comprises two annular, spherical shells 13, 14 connected at their axial ends and configured in the vicinity of the spherical supports 2a and 4a with seals 15 and 16 inserted between them at their upstream ends.

The annular space bounded by the outer spherical support 2a and the inner shell 14 communicates directly with the annular space separating the exhaust housing 2 from the heat shield 4 and receives cooling air F which is discharged with the flow of the exhaust gases through orifices 17 in the connecting end wall 18 of the two shells 13 and 14.

The vectoring structure 12 is fitted at its downstream end with a bracket 19 on which the upstream ends of a plurality of converging flaps 21 are hinged by means of radial hinges 20. The converging flaps 21 are formed of alternating driven flaps and follower flaps. The driven flaps 21 are fitted on their outside surface with reinforcing means 22 on which the downstream ends of linkrods 24 hinge at a pivot 23; the upstream ends of said linkrods 24 hinge at 25 on fittings 26 firmly joined to a drive ring 27, and the drive ring 27 is connected by at least three linear control actuators 28 mutually equidistant about the axis X of the housing 2 to this housing. The cylinders of the linear actuators 28 are connected by radial hinges to the exhaust housing 2 and the rods 30 of said actuators are connected by radial hinges 31 fixedly joined to the drive ring 27.

Identical displacements of the rods 30 of the three linear actuators 28 entails translating the drive ring 27 parallel to the axis X and regulating the 20 exhaust cross-section A8 of the converging flaps 21 due to displacing the linkrods 24 hinging at the locations 23 on the driven converging flaps 21. This configuration furthermore ensures the self-support and centering of the drive ring 27. This drive ring 27 encloses the two support arms 6a and 6b.

When each linear actuator 28 is driven individually, the drive ring 27 tilts relative to the axis X in the selected direction and the set of linkrods 24 applies a torque to each converging flap 21 at the points 23. This torque is transmitted through the converging flaps 21 and the radial hinges 20 to the vectoring structure 12.

The plurality of converging flaps 21 in this manner rotates the vectoring structure 12 and the intermediate ring 9 around their respective axes 7 and 10. In this manner the full ring of converging flaps 21 can be vectored in the desired direction whereby controlled vectored thrust of the turbojet engine is attained.

A second ring of flaps, called the diverging flaps 30, is provided downstream of the converging flaps 21. The second ring of flaps comprises the same number of flaps as the ring of converging flaps and comprises a plurality of driven diverging flaps alternating with follower diverging flaps. The diverging flaps 30 hinge at their upstream end on the downstream end of the converging flaps 21 by means of radial hinges 31. Said diverging flaps 30 furthermore are connected by linkrods 32 extending substantially parallel to the converging flaps 21 and connected to the vectoring structure 12. The lengths of the linkrods 32 and the positions of their hinges are selected to implement the configurations which are appropriate to current flight conditions.

Moreover several angular kinematics laws may be used for the diverging flaps 30 as a function of aircraft mission by providing a second linkage point for each linkrod 32 on the corresponding diverging flap and by replacing such linkrods 32 by other linkrods of a different length prior to flight, said linkrods of different lengths being affixed to the same linkage point on the flaps 32 or to the second one.

FIG. 1 of the drawings furthermore illustrates a ring of outer flaps 40, said ring being situated in the extension of the aircraft's aerodynamic profile. Said outer flaps, which also are called secondary or cold flaps, hinge at their upstream ends on the drive ring 27 by radial hinges 42 and are connected at their downstream ends to the downstream ends of the diverging flaps 30 by a flexible connection device that will not jam the assembly. This flexible connection device may be implemented by linkrods or a sliding link 41 as shown in the drawings.

It is clear that tilting only the drive ring entails rotating the nozzle unit about the center O and that axially displacing the drive ring entails regulating the exhaust cross-section A8 of the converging flaps and the concurrent regulation of the exhaust cross-section A9 of the diverging flaps 30 and of the angle of the outer flaps 40.

In the present invention, the spherical support 2a of the housing 2 is without a structural function. That is, this spherical surface is solely intended for sealing—by means of the seal 15—the space between the vectoring structure 12 and the housing 2.

The friction or rolling between spheres cited in the introduction with respect to the patents depicting the state of the art, are replaced by a universal joint comprising mutually perpendicular conventional hinges, as a result of which any difficulty caused by tolerances, thermal expansions and deformations of such large components is minimized. Also, the hinges absorb the axial and transverse forces applied to the vectoring structure 12.

The foregoing descriptions are provided for illustrative purposes only and should not be construed as in any way as limiting this invention, the scope of which is defined solely by the appended claims.

What is claimed is:

1. A wide-vectoring, axisymmetric exhaust nozzle for a turbojet engine, comprising a ring of converging flaps (21) supported on a vectoring structure (12) which is mounted on the downstream end of an exhaust housing (2) having an axis X in such a way as to be tiltable about a stationary center O located on the axis X, and a device configured to tilt the vectoring structure (12) and regulate the exhaust cross-section (A8) of the converging flaps;

said vectoring structure (12) mounted on the downstream end of the exhaust housing (2) by means of an intermediate ring (9) pivotable, relative to the exhaust housing (2), about a first axis (7) passing through the center O, and pivotable, relative to the vectoring structure (12), about a second axis (10) perpendicular to the first axis (7) and also passing through the center O;

said intermediate ring (9) connected by two mutually diametrically opposite first pivoting links (11a, 11b) to the vectoring structure (12) and further connected to the exhaust housing (2) by two mutually diametrically opposite second pivoting links (8a, 8b) having axes of rotation that are perpendicular to axes of rotation of the first pivoting links (11a, 11b), said intermediate ring (9) resting on two support arms (6a, 6b) situated outside the downstream end of the exhaust housing (2) to which they are rigidly joined; and said tilting device for the vectoring structure (12) being connected by linkrods to the converging flaps (21).

2. The nozzle as claimed in claim 1, wherein the first and the second links are swivels.

3. The nozzle as claimed in claim 1, wherein the converging flaps (21) hinge on the downstream end of the vectoring structure (12) and in that the tilting device for the vectoring structure (12) and regulating the exhaust cross-section (A8) of the converging flaps (21) comprises a single drive ring (27) connected by said linkrods (24) to the converging flaps (21), said drive ring being driven by a plurality of linear actuators (28) connected to the exhaust housing (2).

4. The nozzle as claimed in claim 3, including a ring of diverging flaps (30) which hinge on the downstream ends of the converging flaps (21) and are connected by linkrods (32) to the vectoring structure (12).

5. The nozzle as claimed in claim 4, further comprising a ring of outer flaps (40) which hinge at their downstream ends on the drive ring (27) and are connected by a flexible linkage (41) to the diverging flaps (30).

6. The nozzle as claimed in claim 5, wherein the downstream end of the exhaust housing (2) comprises a spherical segment (2a) and the vectoring structure (12) comprises a spherical shell (13) situated outside the spherical segment (2a).

7. The nozzle as claimed in claim 6, including a seal (15) disposed between the spherical shell (13) and the spherical segment (2a).

8. The nozzle as claimed in claim 3, wherein the flexible linkage (41) is a sliding linkage.

* * * * *

UNITED STATES PATENT AND TRADEMARK OFFICE
CERTIFICATE OF CORRECTION

PATENT NO.     : 6,327,846 B1
DATED          : December 11, 2001
INVENTOR(S)    : Feder et al.

It is certified that error appears in the above-identified patent and that said Letters Patent is hereby corrected as shown below:

<u>Title page,</u>
Item [73], delete "SCNEMA" insert -- SNECMA --
Item [74], delete "Thjomas" insert -- Thomas --

<u>Column 3,</u>
Line 46, delete "20"

Signed and Sealed this

Twenty-ninth Day of October, 2002

Attest:

Attesting Officer

JAMES E. ROGAN
Director of the United States Patent and Trademark Office